United States Patent [19]
Kirsch

[11] 3,741,579
[45] June 26, 1973

[54] PERAMBULATOR

[76] Inventor: Ernst-Guenter Kirsch, In den Poelten 5, 3472 Beverungen, Weser, Germany

[22] Filed: Dec. 4, 1970

[21] Appl. No.: 95,066

[30] Foreign Application Priority Data
July 4, 1970 Germany.................. P 20 33 184.4

[52] U.S. Cl. ............................................. 280/47.38
[51] Int. Cl............................................. B62b 11/00
[58] Field of Search ............ 280/36 B, 41 B, 47.38, 280/47.39, 47.4, 47.41

[56] References Cited
UNITED STATES PATENTS

| | | | |
|---|---|---|---|
| 2,867,448 | 1/1959 | Mandl | 280/36 B |
| 3,532,356 | 10/1970 | Lillibridge | 280/41 B |
| 1,779,742 | 10/1930 | Lines | 280/36 B |
| 2,798,733 | 7/1957 | Gill | 280/41 B |
| 2,516,339 | 7/1950 | Persson | 280/36 B |
| 3,288,482 | 11/1966 | Gottfried | 280/47.38 |
| 3,173,396 | 3/1965 | Bradov | 280/47.38 |
| 795,188 | 7/1905 | Barrat | 280/41 B |
| 2,435,022 | 4/1948 | Troendle | 280/47.38 |

FOREIGN PATENTS OR APPLICATIONS

| | | | |
|---|---|---|---|
| 6,713,834 | 10/1967 | Netherlands | 280/36 B |
| 613,512 | 8/1959 | Italy | 280/36 B |

Primary Examiner—Benjamin Hersh
Assistant Examiner—Robert R. Song
Attorney—McGlew & Toren

[57] ABSTRACT

A perambulator having a body or seat mounted on a chassis, characterized by the feature that a body carrier is provided which is vertically displaceable relative to at least one frame part carrying at least one wheel and a spring member of resilient material located between the body and the upper end region of the frame part.

17 Claims, 5 Drawing Figures

PATENTED JUN 26 1973 3,741,579

INVENTOR:
Ernst-Günter Kirsch

BY: McGlew and Toren
ATTORNEYS

INVENTOR:
Ernst-Günter Kirsch

PERAMBULATOR

The invention relates to a perambulator (or pushchair) having a body or seat on a sprung chassis.

Various embodiments of such perambulators or pushchairs with a sprung chassis have been known hitherto.

The disadvantage of known spring suspension embodiments resides in their relatively involved construction and hence cost; furthermore known spring suspensions are often inadequate with regard to their springing.

It is an object of the invention to provide an improved perambulator or pushchair which is well sprung, in a simple and cheap manner. Preferably the springing is adjustable.

In accordance with the invention a perambulator or pushchair of the kind referred to above comprises a body-carrying seat support which is vertically movable relative to at least one frame member carrying at least one wheel, with a spring element between the said seat support and frame member.

The body carrying support may be hingedly connected on both sides to two frame members of which one member on each side is rigidly connected to the support and the other is hingedly connected to the support at the pivot point; alternatively the two frame members on each side may be pivoted to the support at a common point or at separate hinge points.

The invention will be further described by way of example, with reference to the accompanying drawings, in which.

Figure 1:
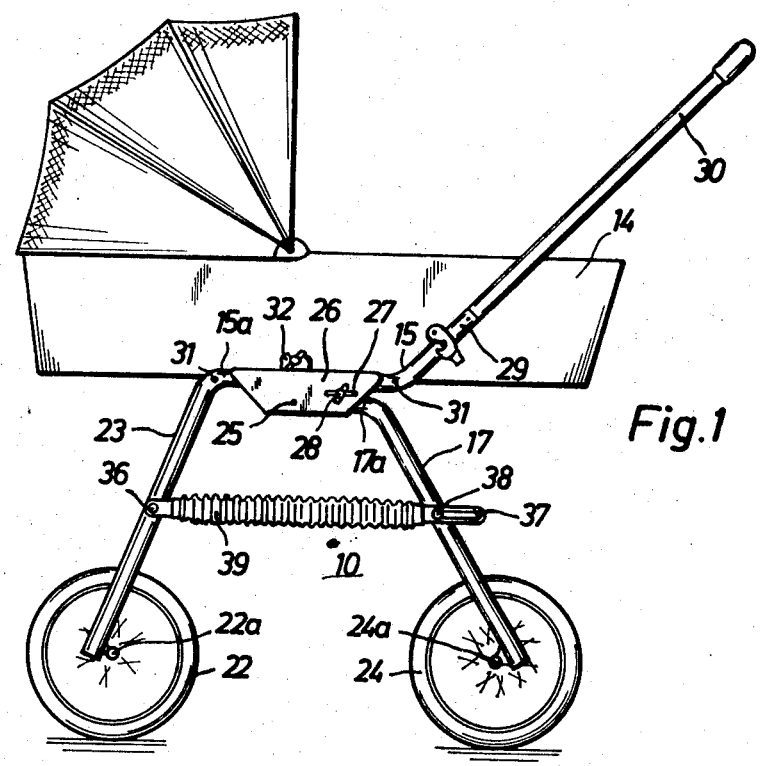
FIG. 1 is a side view of a perambulator having a pram body located on a sprung chassis.
Figure 2:
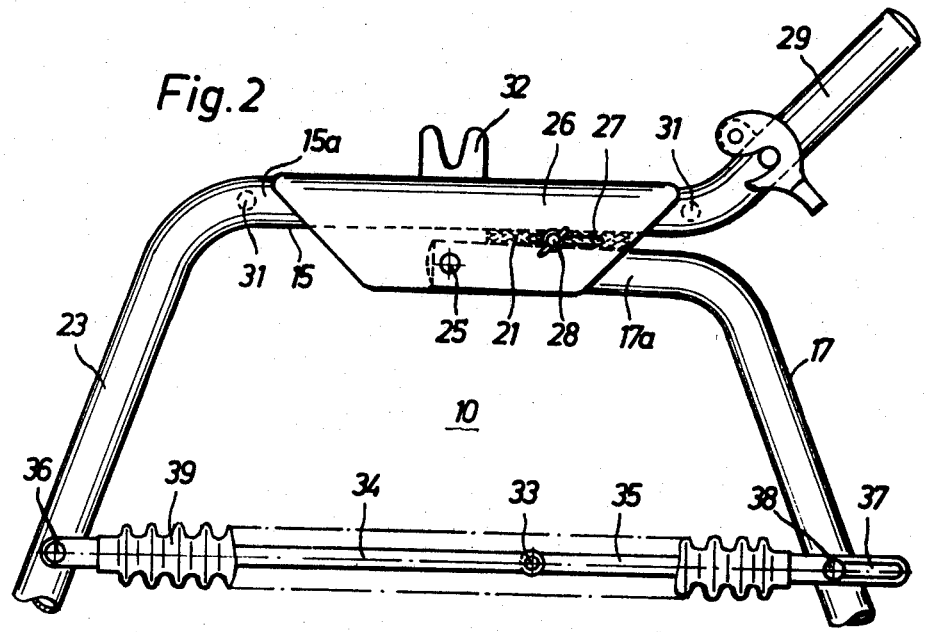
FIG. 2 is a side view of a part of the sprung chassis of FIG. 1 showing the interconnection of parts of the chassis, the springing means and means for locating the pram body on the chassis.

Referring to FIGS. 1 and 2, a perambulator or pushchair with a chassis 10 has a pram body or seat 14 fixedly or removably located thereon. This chassis 10 has a frame member 15 receiving the pram body 14, and is vertically displaceable relative to at least one of the frame members 17, 23, each of which carries one wheel 22, 24. Below the body there is a spring element 21 (FIG. 2) made of a resilient material such as rubber or plastics material between frame members 17 and 23. In FIG. 2 the body 14 is connected rigidly at the front to a side frame member 23 and hingedly connected to a second side frame member 17. It should of course be noted that equivalently shaped frame members 23 and 17 are also provided on the other side of the perambulator.

Figure 3:
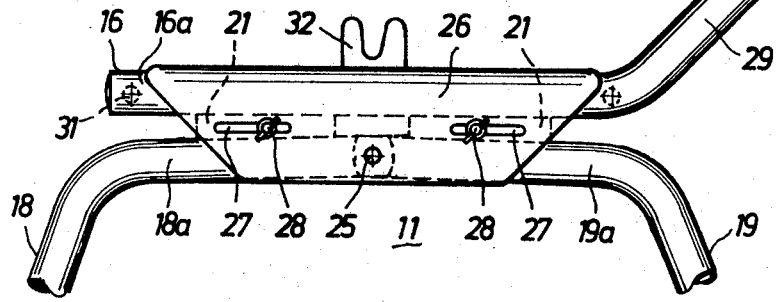
FIG. 3 is a side view of a part of a modified chassis having two support members hingedly mounted at a common point.

The chassis 11 (see FIG. 3) shows two frame members 18, 19 hingedly connected to a base plate 26, the said frame members carrying front and rear wheels 22 or 24 as before. The frame members are connected to the plate 26 at a common hinge point 25 and sprung by spring members 21 arranged on both sides of the hinge point 25 (seen in the direction of travel) relative to the plate 26. The plate carries an upper or support member 16.

Figure 4:
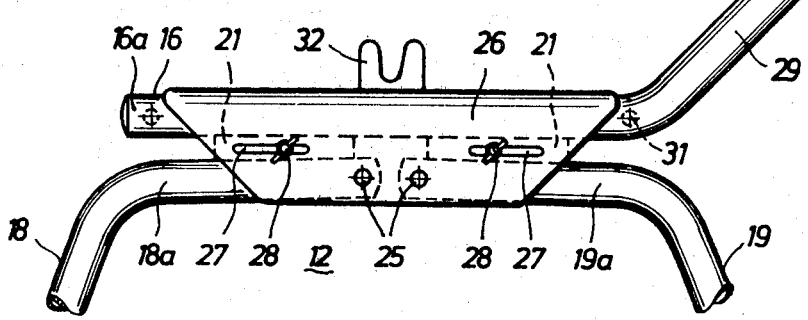
FIG. 4 is a side view of a part of a modified chassis having two supporting members hingedly connected at separate hinge points.

FIG. 4 shows a modified chassis 12 corresponding in basic structure to the chassis 11; here the two frame members 18, 19 each have an individual hinge point 25, the points being slightly spaced apart on the plate 26. To the front and rear of these hinge points 25 there is a resilient spring member 21 between the plate 26 and each frame member 18, 19.

Figure 5:
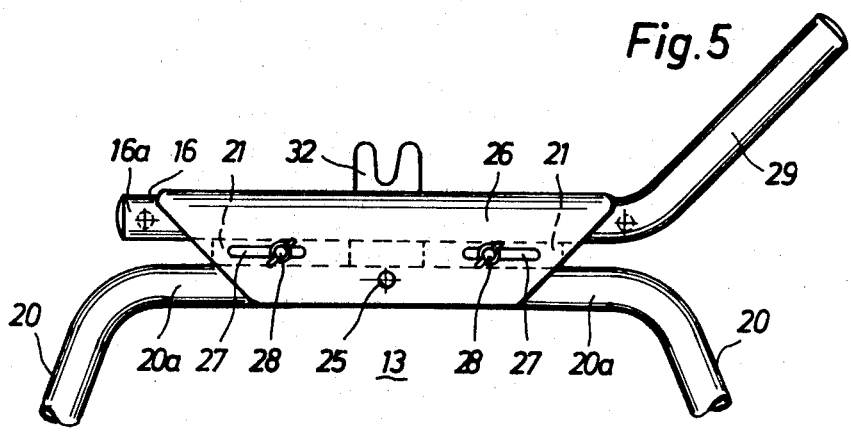
FIG. 5 is a side view of a part of a further chassis having a rigid supporting member.

The chassis 13 (see FIG. 5) has a single rigid frame member 20 on each side, the said members each carrying one front and one rear wheel. The frame member is formed at a hinge point 25 to the plate 26 and sprung relative the plate 26 by a spring member 21 one of which is located on each side of this hinge point 25.

The spring member or members 21 are slidable towards or away from the hinge point 25, so that by varying the spacing of the spring member 21 relative to the hinge point the softness or rigidity of the spring suspension may be varied.

This adjustment is made by means of a screw 28 displaceable in a slot 27 formed in the plate 26 and extending in the direction of travel. An element to be actuated without the use of tools such as a hand screw or tension lever or the like is preferably provided as a fixing means 28; thus a screw used as adjusting means can pass through the spring member 21 and be fixed by a nut.

The spring part 21 has a rectangular cross-section and is formed in the form of a plate or strip; it is preferable for the spring part to taper towards the end adjacent to the hinge point 25; thus the spring part 21 due to its wedge shape constitutes a buffer member and the wedge form has a favorable effect on the resilience on the suspension.

As shown by the embodiments in the drawings, the supporting parts 17, 18, 19, 20 and 23 are formed as struts from metal tubes. On each side of the pram two struts, one behind the other and diverging downwards, extend as supporting parts 17, 23 and 18, 19.

The seat carrier 15, 16 is formed from two lateral struts or tubes 15a, 16a and comprises two handle members 29 pointing upwardly at an acute angle relative to the carrier plane. The handle members on each side are interconnected by a fixed or sliding handle 30.

The two side members 15a, 16a, of the carrier 15, 16 may be interconnected at the front of the pram so that the carrier 15, 16 forms an integral U-shaped part.

In the chassis embodiment shown in FIG. 2, the side members 15a of the carrier 15 merge into the downwardly extending support parts 23 and each of the lateral side members 15a or the whole carrier 15 with a support part 23 or both support parts 23 forms a single integral whole, bent from one piece of tube. The carrier 15, 16 may alternatively be formed as a plate or a frame.

At the front and rear of the carrier side members 15, 16 there is a rod, tube or flat bar interconnecting them to act as bearings 31 for the pram body 14. The pram body 14 is supported on these bearings 31 and is retained detachably on the carrier members 15, 16 by a fork 32 provided on the plate 26.

This plate is formed as a U-shaped yoke overlapping each side member 15a, 16a and secured thereto by welding or screwing, the yoke receiving the frame parts 17, 18, 19, 20 between its downwardly extending and downwardly opened U-shanks. These two U-shanks of each holding part 26 define the hinge point or points 25 and are provided with a slit 27 in one or both U-shanks. The underside of the members 15a, 16a presents a supporting surface for the springs 21 and the region 17a, 18a, 19a, 20a of each frame part 17, 18, 19 and 20 supports the spring 21. The lower free ends of the frame members 17, 23; 18, 19; 20 are retained spaced apart by a rigidly mounted wheel axle 22a, 24a from their counterparts on the other side of the pram. These wheel axles 22a, 24a carry detachable or fixed wheels 22, 24.

The two supporting parts 17, 23; 18, 19 on each side of the pram chassis 10, 11, 12 and below the carrier plate 26 are each secured by a collapsible device in their work position against accidental collapse. This device consists of two links 34, 35 hingedly interconnected at a common hinge point 33 and mounted displaceably on the supporting parts 17, 23; 18, 19. The link 34 at its end remote from the hinge point 33 is hinged at point 36 on the frame part 23, 18 and the link 35 at its end remote from the hinge point 33 has an elongated slot or hole 37 formed therein with which it engages a pin 38 acting as a hinge point.

A gaiter 39 surrounds the links 34, 35.

Due to the spring parts 21 located on both sides of the pram, shocks or impacts due to passage over uneven ground are absorbed. The elongated hole 37 of the levers 35 permits the frame parts 17, 23 and 18, 19 to pivot about their common hinge point 25 or about both hinge points 25 this pivotal movement being limited by the length of the slot 37; the springing effect occurs within this pivotal movement.

If the links 34, 35 are collapsed at their connecting point 33 upwards or downwards, the chassis 10, 12 can be folded, the frame parts 17, 23, 18, 19 moving towards one another. During this folding movement the spring part 21 is retained by the locating means 28 against the underside of the carrier members 15, 16; only the frame parts 17, 18, 19 are pivoted away from the spring part 21.

In place of the spring elements 21 made of a resilient material, flat springs may be used.

In a further embodiment, not shown, the frame parts 17, 23, 18, 19 are formed as plates, or the integral side part 20 may be formed as a plate.

In a further embodiment, not shown, there is a plate-shaped supporting part at the front and rear taking the place of frame parts 17, 23, 18, 19, 20, the plates being bent over at their tops to extend below the carriers 15, 16.

A spring suspension in accordance with the invention may be used in children's vehicles such as tricycles.

I claim

1. A perambulator comprising a chassis arranged to support a member, such as a pram body or seat, a body carrier member mounted on two of the opposite sides of said chassis, said body carrier member including means for pushing and guiding the perambulator, a pair of chassis legs connected to each said body carrier member and each of said legs having a portion extending downwardly from said body carrier member, a wheel mounted on the lower end of each of said chassis legs, at least one of said chassis legs having a substantially horizontally extending section pivotally mounted to said body carrier member with the upper surface of said horizontally extending section located below a downwardly facing portion of said body carrier member, and a spring member located between the upper surface of said horizontally extending section and the superjacent downwardly facing portion of said body carrier member, said spring member acts as a buffer member and is formed of a rubber-like resilient material for providing the perambulator suspension.

2. A perambulator, as set forth in claim 1, wherein said spring member is formed of one of rubber and plastics material.

3. A perambulator, as set forth in claim 1, wherein each of said chassis legs is bent at an intermediate location along its longitudinal direction providing each of said chassis legs with one said substantially horizontally extending section and a downwardly extending section with the downwardly extending sections of said chassis legs connected to one said body carrier member being disposed in downwardly diverging relationship, a wheel bearing provided at the lower end of each of said downwardly extending sections of said carrier legs, and each of said horizontally extending sections of said chassis legs is pivotally connected to said body carrier member.

4. A perambulator, as set forth in claim 3, wherein each of said chassis legs connected to a common said body carrier member are pivoted thereto at a common pivot point, at least one said spring member associated with each of said chassis legs and each said spring member is spaced from said common povot point and is positioned between said common pivot point and the bend in said chassis leg with which it is associated which separates the horizontally extending section of said chassis leg from its downwardly extending section.

5. A perambulator, as set forth in claim 4, wherein each of said chassis legs associated with a common said body carrier member is pivotally connected to said body carrier member at a different pivot point, said pivot points being located slightly spaced apart, and at least one said spring member associated with each of said chassis legs and said spring member being spaced from the pivot point which pivotally connects said chassis leg with which it is associated to said body carrier member and from the bend in said chassis leg which divides said chassis leg onto its horizontally extending section and downwardly extending section.

6. A perambulator, as set forth in claim 1, wherein each of said chassis legs associated with a common said body carrier member is interconnected forming a unitary U-shaped legs member with the downwardly extending leg portions thereof disposed in downwardly diverging relationship, a wheel axle bearing located at the lower end of each of said leg portions, said legs member being pivotally mounted to said body carrier member and a pair of said spring members disposed in spaced relationship from one another and each located on an opposite side of the pivot point which pivotally connects said legs member to said body carrier member.

7. A perambulator, as set forth in claim 1, wherein the other one of said chassis legs associated with a common said body carrier member is integrally connected to said means for pushing and guiding said perambulator which means are secured to said body carrier member.

8. A perambulator, as set forth in claim 1, wherein each said body carrier member extending in the normal direction of travel of the perambulator and having at least one slot elongated in the direction of the normal direction of travel of the perambulator, a locating means associated with each spring member and extending through one said slot, said locating means including a screw member in engagement with said spring member and arranged to extend through and to be secured to said body carrier member.

9. A perambulator, as set forth in claim 7, wherein said spring member has a plate-like configuration with a rectangular cross section.

10. A perambulator, as set forth in claim 8, wherein each said spring member having a first end closer to the pivot point which pivotally connects its associated said chassis leg to said body carrier member and a second end spaced from said first end in the normal direction of movement of said perambulator, and the sides of said spring member tapering inwardly from said second end to said first end.

11. A perambulator, as set forth in claim 9, wherein the upper surface of the horizontally extending section of said chassis leg which contacts said spring member is curved for forming a supporting surface for said spring member.

12. A perambulator, as set forth in claim 4, wherein said chassis legs pivotally connected to said body carrier member are vertically adjustable relative to said body carrier member.

13. A perambulator, as set forth in claim 1, wherein said means for pushing and guiding the perambulator comprises a strut secured to each said body carrier member and extending from said body carrier member in the direction opposite to the normal forward movement direction of the perambulator, said strut being arranged in the substantially horizontal position in the normal travel condition of the perambulator and rearwardly of said body carrier plate being bent upwardly obliquely to the horizontal and interconnected to the other said strut associated with the other said carrier member by a substantially horizontally extending strut section at the upper ends of the obliquely disposed sections.

14. A perambulator, as set forth in claim 13, wherein a pair of bearing rods are secured to and extend between the horizontally extending portions of said struts secured to said body carrying members for forming a support for the member supported on the chassis.

15. A perambulator, as set forth in claim 1, wherein said body carrier member comprises a U-shaped plate elongated in the normal direction of movement of the perambulator and having its opening facing downwardly so that the sides of said plate extend downwardly at least to the bottom surface of the horizontally extending section of said chassis leg pivoted thereto.

16. A perambulator, as set forth in claim 15, wherein said U-shaped plate having a device secured to and extending upwardly from the upper surface thereof for positionally and detachably fixing the member on said carrier which is supported by said chassis.

17. A perambulator, as set forth in claim 1, wherein a device is positioned between each of the chassis legs connected to a common said body carrier member and said device comprises a pair of links connected together and a common hinge point with one said link connected to said chassis leg at the front end of the perambulator and the other said link having a slot therein through which it is displaceably pivotally connectible to said chassis leg on the rearward end of the perambulator, and a gaitor enclosing both of said links.

* * * * *